Patented Aug. 24, 1937

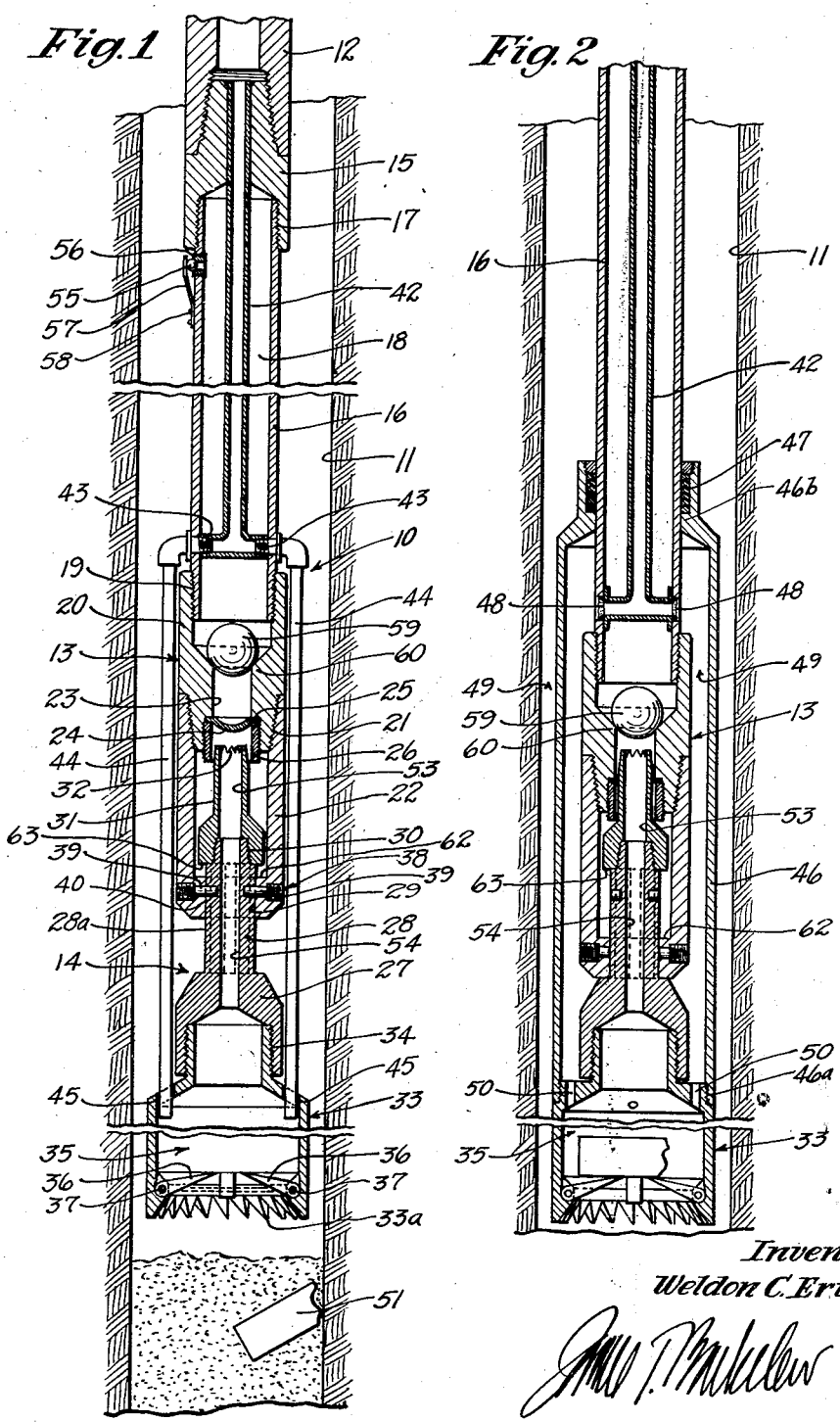

2,090,616

UNITED STATES PATENT OFFICE 2,090,616

FISHING TOOL

Weldon C. Erwin, Huntington Park, Calif., assignor to John Grant, Los Angeles, Calif.

Application June 5, 1935, Serial No. 25,069

12 Claims. (Cl. 294—86)

This invention has to do generally with oil well fishing tools, and particularly with tools of this character which operate to dislodge and retain the fish, i. e., the object to be recovered, by a suction effect produced by suddenly releasing the well fluid and sand in the vicinity of the fish into a normally empty low pressure chamber within the tool, or within the drill pipe on which it is lowered into the well.

One of my principal objects is to provide a fishing tool of this type whereby preliminarily to drawing in and retaining the fish within the tool, the latter may be operated to cut around and center the fish in proper position for recovery. The invention also has for its object to provide an improved mechanism whereby the low pressure chamber closure may be opened as a result of vertical movement of the suspension means or pipe string, or, more specifically, by virtue of relative vertical movement between parts of the tool. In the particular form of the invention hereinafter described, and in conjunction with the closure opening mechanism, I have provided means whereby a portion of the drill string load may be brought to bear on the tool during the preliminary operation of milling around and centering the fish, and releasable means whereby the pipe string weight may be utilized for the purpose of opening the chamber closure. Additional features of the invention have to do with means for maintaining a flow of circulating fluid downwardly through the pipe string to the lower end of the fishing tool, past the low pressure closure and independently of its condition, i. e. regardless of whether it is open or closed.

The above mentioned and various other features and objects of the invention will be clearly understood from the following detailed description, wherein reference is made to the accompanying drawing, in which:

Fig. 1 is a sectional view showing a typical form of fishing tool embodying the invention, and with the charge receiving chamber closed from communication with the well; and Fig. 2 is a sectional view, showing a variational form of the invention, with the parts in the positions taken after the charge receiving chamber closure has been opened.

Referring first to Fig. 1, the fishing tool, generally indicated at 10, is shown to be lowered into the well bore 11 on the lower end of the drill pipe or tubing 12 extending to the ground surface. In its preferred form, the fishing tool comprises a body including upper and lower relatively vertically movable sections 13 and 14, attached to the drill pipe 12 by coupling 15. Upper body section 13 comprises a tubular section 16 threaded at 17 into coupling 15, and forming a normally closed charge receiving chamber 18, pipe 16 being of considerable length in order to form a charge receiving chamber of a capacity sufficient to take in a substantial volume of well fluid, as hereinafter explained. The lower end of tube 16 is threaded at 19 into an intermediate section 20 of the upper body portion 13, section 20 in turn being threadedly connected at 21 with the lower section 22 of the upper body portion.

Intermediate section 20 has a reduced diameter bore 23 which forms the inlet to the charge receiving chamber 18, and which is normally closed by a suitable closure means, to seal the said chamber against the entry of well liquid until the tool is operated to recover the fish. In certain of its aspects, the invention broadly contemplates the provision of any suitable type of closure adapted to be opened by movement of the suspension pipe 12, or by relative movement between the body sections 13 and 14, to place the charge receiving chamber in communication with the well through the lower body section. In other and more specific aspects, the invention is particularly concerned with the use of a frangible disk-type closure in fishing tools of this type, and a disk breaking means operated by movement of the suspension pipe or relative movement between sections of the tool body.

I have shown the closure for chamber 18 to comprise a frangible member or disk 24 clamped between body shoulder 25 and retaining nut or bushing 26 threaded into the lower end of body section 20. Lower body section 14 includes a tubular member 27 having an integral, reduced diameter mandrel portion 28 extending upwardly through the lower end of the bottom portion 22 of the upper body section 13. Relative rotation between the two body sections 13 and 14 is prevented by mandrel splines 28a extending through ways 29 in body portion 22. Threaded at 30 on the upper end of the mandrel portion 28 is a disk breaking member 31 preferably in the form of a tube having an upper toothed end 32 adapted to engage and break the disk 24 upon downward relative movement of the upper body section 13, as will presently appear.

Lower body section 14 also includes a fish receiving and retaining means shown typically in the form of a hollow shoe 33 threaded at 34 into the lower end of member 27. If desired, shoe 33 may be provided with a series of cutting teeth 33a in order that the tool may be used to mill around and center the fish within the shoe, prior to and in preparation for subsequently drawing the fish into the interior 35 of the shoe upon opening the low pressure chamber 18. Suitable means, such as a plurality of inwardly projecting fingers 36 pivotally mounted at 37 within the shoe 33, are provided for the purpose of retaining the fish after it has been drawn up into space 35.

The normal positions of the parts are as shown in Fig. 1, wherein body section 13 is releasably held in raised position relative to the lower section 14 by releasable means generally indicated at 38. It will be understood that the latter may be of any suitable type capable of resisting or preventing downward movement of the upper body section under sufficient load to afford the necessary pressure on the shoe 33 to effectively mill around and center the fish, but yet capable of being released to permit downward relative movement of the upper body section for the purpose of opening the charge receiving chamber closure. As a typical means 38 for releasably maintaining the body sections in the relative positions of Fig. 1, I have shown a pair of shear pins 39 projecting from body portion 22 into the mandrel 28 as at 40. Pins 39 will have sufficient resistance to shearing to transmit to the shoe 33 a pressure or load necessary for cutting operations, but will become sheared under at least the entire weight of the drill string, to drop the upper body section 13 to the disk breaking position of Fig. 2.

Before performing the fishing operation and while the tool is being used preliminarily to center the fish, it is desirable to maintain a circulation of fluid down through the drill string 12 to the vicinity of the shoe 33. It is also desirable, in view of the necessity for maintaining a chamber 18 in closed condition prior to drawing in the fish, that the circulation be maintained around or past the disk 24, with the latter closed. Circulation may be maintained by providing within chamber 18 a tube 42 terminating at its upper end within coupling 15, and connecting by way of nipples 43 with pipes 44 extending downwardly at the outside of the body through openings 45 into the interior 35 of shoe 33. Pipes 44 may have a sliding fit within openings 45, or at least just sufficient clearance to allow upward movement of the shoe 33 relative to the pipes during the disk breaking operation, without binding.

Fig. 2 shows a variational form of the invention similar in all respects to Fig. 1, except as to the substitution of a body encircling sleeve in place of pipes 44 of Fig. 1, for conducting the circulating fluid from the point of discharge from pipe 42, into the shoe 33. In Fig. 2, a sleeve 46, placed about the body of the tool, is secured at its lower end 46a, by threading or in any other suitable manner, to the shoe 33, the upper end 46b of the sleeve having a sliding fit with the outside of tubular portion 16 of the upper section 13 of the tool. If desired, packing 47 may be provided within the upper end 46b of the sleeve to prevent upward leakage of circulating fluid being discharged from pipe 42 through openings 48 into the annular space 49 within the sleeve 46. The circulating fluid passes from space 49 downwardly through openings 50 in the top shoulder of the shoe into the interior 35 thereof.

In operation, the tool is lowered to the bottom of the well and the drill string 12 rotated to cause the teeth 34 to mill around the lodged object or fish 51 and center the latter within the lower end of the shoe. Pins 39 have sufficient resistance to shearing to enable a substantial pressure or load to be imposed on the shoe, thus enabling the latter to effectively cut around and preliminarily position the fish 51 for recovery. Thereafter, the entire weight of the drill string, or a sufficient portion of its weight, is released onto the pins 39 to cause them to shear and the upper body section 13 to move downward, relative to the lower body section 14, to the position of Fig. 2. As a result of such movement, the disk 24 is projected down against the upper end 32 of the disk breaking member 31 with sufficient force to rupture the disk and place chamber 18 in communication with the interior 35 of shoe 33 via bores 53 and 54 of member 31 and the mandrel portion 28.

The low pressure chamber 18 thus is suddenly placed in communication with the well, with the result that by reason of the pressure differential, there is induced a sudden rush of well fluid upwardly through the shoe 33 and bores 54 and 53 into the low pressure zone. By reason of the suction effect and high velocity flow of the well fluid upwardly into the low pressure chamber, the fish 51 is displaced or drawn up into the interior 35 of the shoe past the pivoted fingers 36. After having been drawn into the shoe, the fish is retained against dropping out by the fingers 36, as shown in Fig. 2, and the fish is then recovered by elevating the tool to the ground surface.

If desired, provision may be made for bleeding air from the interior of the low pressure chamber 18 by means of an outwardly opening check valve 55 pressed into engagement with its seat 56 by means of a leaf spring 57 attached at 58 to the outside of body portion 16. Ordinarily, I prefer to allow the charge consisting of well liquid and sand, drawn upwardly into the low pressure chamber 18 as previously explained, to drain back into the well after the fish 51 has become retained. However, if desired, the charge taken into the low pressure chamber may be trapped therein for removal to the ground surface, by inserting within body portion 20 a check valve 59 which raises to permit the upward flow into chamber 18, and then seats on shoulder 60 to trap the charge in the chamber thereafter.

At the completion of the described fishing operation, the pipe string is raised to bring shoulder 62 into engagement with lower end 63 of the disk breaking member, continued upward movement of the pipe string then elevating the entire tool assembly. In case it should happen that as a result of the sudden release of well pressure into the charge receiving chamber 18, the lower portion or shoe 33 of the tool becomes "sanded", i. e., submerged in a deposit of sand to such an extent as to offer substantial resistance to its removal, extraction of the tool may be facilitated by rotating the shoe, through the splined engagement between the mandrel 28 and the upper body section. The provision for relative longitudinal movement between the body sections 13 and 14 and the engagement between shoulder 62 and 63 affords a further means of loosening the shoe in case it should become stuck in the well, in that by lowering the upper body section to the position of Fig. 2 and then raising shoulder 62 upwardly into impacting engagement with shoulder 63, a jarring effect is produced that acts immediately to dislodge the shoe.

I claim:

1. In a fishing tool of the character described, the combination comprising a body, means forming a low pressure chamber within the body, a frangible closure below said chamber and adapted to be opened to admit well fluid thereto, suspension means on which said body is lowered in the well, means at the lower end of said body and movable vertically relative thereto, for receiving and retaining a fish to be recovered, means operable by straight relative vertical movement between the body and the last mentioned means to open said closure and thereby induce a flow of well fluid into said chamber, and means for maintaining a flow of circulating fluid downwardly through the suspension means and past said closure to the lower end of said body.

2. In a fishing tool of the character described, the combination comprising a body, means forming a low pressure chamber within the body, a frangible closure below said chamber and adapted to be opened to admit well fluid to a low pressure chamber, suspension means on which said body is lowered in the well, means at the lower end of said body and movable vertically relative thereto, for receiving and retaining a fish to be recovered, means operable by straight relative vertical movement between the body and the last mentioned means to open said closure and thereby induce a flow of well fluid into said chamber, and means on said body for maintaining a flow of circulating fluid downwardly through the suspension means and said low pressure chamber, and past said closure to the lower end of said body.

3. In a fishing tool of the character described, the combination comprising a body, means forming a low pressure chamber within the body, a frangible closure below said chamber and adapted to be opened to admit well fluid to a low pressure chamber, suspension means on which said body is lowered in the well, means at the lower end of said body for receiving and retaining a fish to be recovered, means operable by movement of said suspension means to open said closure and thereby induce a flow of well fluid into said chamber, and means on said body for maintaining a flow of circulation fluid downwardly through the suspension means and past said closure to the lower end of said body, the last mentioned means comprising a tube extending downwardly through said chamber, and means forming a fluid passage communicating with said tube above said closure and with the interior of said fish receiving means.

4. In a fishing tool of the character described, the combination comprising a body having upper and lower relatively vertically movable sections, a closure adapted to be opened to admit well fluid to a low pressure space within said upper body section, means at the lower end of said body for receiving and retaining a fish to be recovered, means operable by relative vertical movement of said body sections to open said closure and thereby induce a flow of well fluid into said chamber, and a pipe surrounding said lower body section and conducting circulating fluid from a passage within said upper body section into the interior of said fish receiving means.

5. In a fishing tool of the character described, the combination comprising a body having upper and lower relatively vertically movable sections, means forming a low pressure chamber within said upper body section, a closure within said upper body section adapted to be opened to admit well fluid to said low pressure chamber, closure opening means within said lower body section, a downwardly seating check valve above said closure acting to trap well fluid within said chamber, means at the lower end of said body for receiving and retaining a fish to be recovered, said closure opening means being operable by relative vertical movement of said body sections to open said closure and thereby induce a flow of well fluid into said chamber.

6. In a fishing tool of the character described, the combination comprising a body having upper and lower relatively vertically movable sections, means forming a low pressure chamber within said upper body section, a closure adapted to be opened to admit well fluid to said low pressure chamber, a closure supporting member, means releasably holding said sections against relative vertical movement, means at the lower end of said body for receiving and retaining a fish to be recovered, means operable by relative vertical movement of said body sections to open said closure and thereby induce a flow of well fluid into said chamber, and a check valve seating on said closure supporting member above the closure to trap well fluid within said chamber.

7. In a fishing tool of the character described, the combination comprising a body having upper and lower relatively vertically movable sections, means forming a low pressure chamber, interengaging splines on said body sections, a closure adapted to be opened to admit well fluid to said low pressure chamber, means at the lower end of said body for receiving and retaining a fish to be recovered, and means operable by relative vertical movement of said body sections to open said closure and thereby induce a flow of well fluid into said chamber; and a downwardly seating check valve within said upper body section above said closure.

8. In a fishing tool of the character described, the combination comprising a body having a frangible disk closure adapted to be opened to admit well fluid to a low pressure space, a tubular member supporting said disk, a check valve seating downwardly on said member above the disk, means at the lower end of said body and movable vertically relative thereto, for receiving and retaining a fish to be recovered, and means operable by straight relative vertical movement between the body and the last mentioned means to open said closure and thereby induce a flow of well fluid into said space.

9. In a fishing tool of the character described, the combination comprising a body having upper and lower relatively vertically movable sections, a frangible disk closure adapted to be opened to admit well fluid to a low pressure space, a tubular member supporting said disk, a check valve seating downwardly on said member above the disk, means at the lower end of said lower body section for receiving and retaining a fish to be recovered, and disk breaking means operable by relative vertical movement of said body sections to open said closure and thereby induce a flow of well fluid through the lower body section into said space.

10. In a fishing tool of the character described, the combination comprising a body having upper and lower relatively vertically movable sections, a closure adapted to be opened to admit well fluid to a low pressure space within said upper body section, means at the lower end of the lower body section for receiving and retaining a fish to be recovered, means holding said sections against relative rotation, means for opening said closure to draw a well fluid charge upwardly through the lower body section into said spaces by virtue of relative vertical movement between said body sections, and means for maintaining a downward circulation of fluid past said closure to the lower end of said lower body section.

11. In a fishing tool of the character described, the combination comprising a body having upper and lower relatively vertically movable sections, a closure adapted to be opened to admit well fluid to a low pressure space within said upper body section, means at the lower end of the lower body section for receiving and retaining a fish to be recovered, means holding said sections against relative rotation, means for opening said closure to draw a well fluid charge upwardly through the lower body section into said space by virtue of relative vertical movement between said body sections, means for maintaining a downward circulation of fluid past said closure to the lower end of said lower body section, and means for releasably holding the upper body section against downward movement relative to the lower section.

12. In a fishing tool of the character described, the combination comprising a body having an upper section containing a low pressure space, and a lower relatively vertically movable tubular section having a reduced diameter portion projecting upwardly into the upper section, a closure adapted to be opened to admit well fluid into said low pressure space, means holding said body sections against relative rotation, means operable by relative vertical movement between said sections to open said closure and thereby induce a flow of well fluid upwardly through the lower body section into said low pressure space, means releasably holding the upper body section against downward movement relative to the lower section.

WELDON C. ERWIN.